Sept. 16, 1930.    G. W. EMRICK    1,775,992
CHUCK DEVICE
Filed Oct. 14, 1927
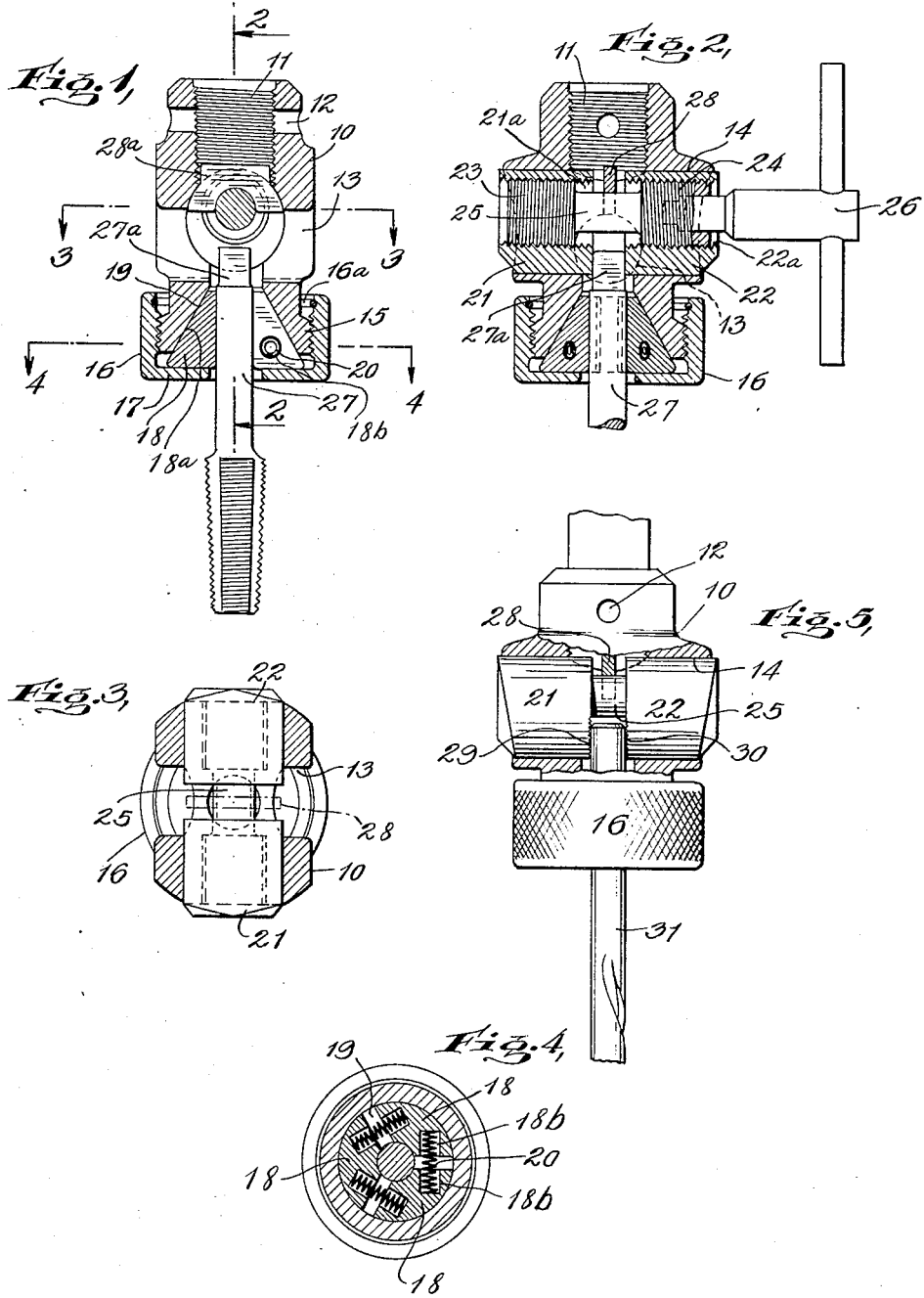
INVENTOR
George W. Emrick
BY
Howard C. Thompson
ATTORNEY Patented Sept. 16, 1930

1,775,992

UNITED STATES PATENT OFFICE

GEORGE W. EMRICK, OF BROOKLYN, NEW YORK, ASSIGNOR, BY MESNE ASSIGNMENTS, TO ETTCO TOOL CO. INC., OF BROOKLYN, NEW YORK, A CORPORATION OF NEW YORK

CHUCK DEVICE

Application filed October 14, 1927. Serial No. 226,077.

This invention relates to chuck devices for use in connection with drilling tapping and similar machines; and the object of the invention is to provide a chuck device of the class described with two sets or series of jaws for movement into engagement with a tool inserted into the chuck, for example, a tap or drill, so that each series of jaw members will engage the shank of the tool independently to firmly support and retain the tool in connection therewith, one series of jaw members serving to center the tool in the chuck device and the other to forcibly engage the tool to prevent turning or other movement of the tool in the chuck; a further object being to provide a chuck device, the body portion of which is open at one or two sides to give tension to one series of the jaw member thereof, whereby the engagement of said jaw members with the shank of the tool may be seen primarily for the purpose of properly engaging the square or angular end of the shank of the tool; a further object being to provide a chuck device wherein one series of jaw members is in the form of tapered wedge jaws movable radially and longitudinally of the axis of the tool, and the other series of jaws being movable radially with reference to the tool, and consists of a feed screw having left and right hand threaded ends for feeding jaw members in threaded engagement with said screw toward and away from the shank of the tool; and with these and other objects in view, the invention consists in a device of the class and for the purpose specified, which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which :—

Fig. 1 is a sectional view through a chuck device made according to my invention and illustrating the method of its use.

Fig. 2 is a section on the line 2—2 of Fig. 1.

Fig. 3 is a section on the line 3—3 of Fig. 1.

Fig. 4 is a section on the line 4—4 of Fig. 1; and,

Fig. 5 is a side and sectional view, similar to Fig. 2 but showing a modification.

In practice, I provide a chuck body or casing 10, the upper end of which is provided with a threaded bore 11 arranged vertically therein as seen in the accompanying drawing to permit of the mounting of the body 10 in connection with a spindle of a tapping, drilling or other machine. At 12, I have shown apertures in the side walls of the body to receive a spanner or similar wrench to facilitate the mounting of the chuck body in connection with the machine spindle.

The body 10 is provided with a transverse bore or passage 13 opening through opposite sides thereof as clearly seen in Figs. 1 and 3, and the threaded bore 11 extends into the bore 13, and another bore 14 transverses the body 10 at right angles to the bore 13. The lower end of the body 10 is externally threaded as seen at 15 to receive a cup-shaped nut 16, the bottom flange 17 of which is adapted to operate in connection with wedge-shaped jaws 18, three of which are employed in the construction shown, said jaws having beveled outer faces 18ª for engagement with the beveled faces or conical formation of a bore 19 in the lower end of the body 10 to move the jaw members 18 longitudinally and radially with respect to the axis of the body 10 in the adjustment of the cap nut 16. The jaw members 18 are normally held in spaced relation in the bore 19 by springs 20 operating in sockets 18ᵇ in the adjacent faces of the jaws 18 as seen in Fig. 4 of the drawing. The cup-shaped nut 16 is held against displacement from the body 10 by a spring ring 16ª as clearly seen in Figs. 1 and 2 of the drawing.

The jaw members 18 constitute one unit jaw construction, and another unit jaw construction consisting of two radially movable jaws 21 and 22 is mounted in the transverse bore 14. Arranged eccentrically of the jaws 21 and 22 are threaded bores 21ª, 22ª, one bore having a left hand thread and the other a right hand thread to engage correspondingly threaded portions 23 and 24 on a feed screw 25, the central portion of which is reduced.

One side of this screw, the side provided with the threads 24, is provided with an angular stock for an operating key 26 shown in Fig. 2 of the drawing. By means of this key, the screw 25 may be rotated to move the jaws 21 and 22 upwardly or outwardly with respect to the axis of the body 10 or with respect to the shank of a tapping or other tool 27, and especially the squared end 27ª thereof.

By virtue of the eccentric arrangement of the bores 21ª and 22ª in the jaws 21 and 22, said jaws are retained against rotation in the bore 14, especially by virtue of a yoke-shaped key or retaining member 28 arranged to partly encircle the reduced portion of the feed screw 25 as clearly seen in Figs. 1 and 2 and said key 28 is provided with an angular extension 28ª which enters the bore 11. The key 28 also retains the unit jaw construction, consisting of the jaws 21 and 22, from lateral displacement in the body 10. However, in assembling the device, the key 28 is placed upon the screw 25, and said parts as assembled, placed in the bore 14, after which the jaws 21 and 22 are mounted on the outer ends of the feed screw, and by rotating said screw the jaws will be fed inwardly. In the same manner, the outward feeding of the jaws will dissect the parts as will be apparent. The jaws 18 may be removed by removing the spring ring 16ª.

In Fig. 5 of the drawing, I have shown a slight modification of the construction shown in Figs. 1 to 4 inclusive, wherein the jaws 21 and 22 are provided with roughened gripping surfaces 29 and 30 respectively, instead of with plain surfaces as seen in the other figures to adapt the device for use in connection with tools, such as drills 31 having round or unsquared or angular shanks. With this construction, it will be apparent that the jaws 21 and 22 in combination with the jaws 18 will securely retain the tool 31 in connection with the device, and prevent, at least to a greater degree, the possibility of rotation of the drill or other tool in the chuck.

In both forms of construction, the bore 13 which if desired may open through one side only of the body 10, permits the operator to properly set the jaws 21 and 22 on the angular shank 27ª of a tapping or other tool; that is to say, to properly aline the opposite squared sides of the shank with the flat faces of said jaws. It will be understood that in mounting the tapping or other tool in connection with the chuck, it is first centered in the body 10 by the engagement with the jaws 18 therewith, after which the jaws 21 and 22 are moved into firm engagement with the shank by the use of the key or other tool 26. In addition to preventing the rotation of the tool in the chuck body, the jaws 21 and 22 also strengthen and reinforce the support of the tool in the chuck body and prevent to a large degree, any possible tilting of the tool in the operation thereof.

It will be understood that while I have shown certain details of construction for carrying my invention into effect and have illustrated two uses thereof, that I am not necessarily limited to the construction of the device and use thereof herein shown and described, and various changes therein and modifications thereof may be made within the scope of the appended claims without departing from the spirit of my invention or sacrificing its advantages.

Having fully described my invention, what I claim as new and desire to secure by Letters Patent, is:—

1. A chuck device comprising a body portion having a cylindrical bore extending transversely through the axis thereof, two cylindrical jaws mounted to fit snugly in the opposite end portions of said bore and free to move radially of said body, said jaws having threaded bores, the axis of which is eccentric to the axis of said jaws, a feed screw having left and right hand threaded end portions in threaded engagement with the bores of said jaws and arranged entirely within the peripheral boundaries of said jaws, means whereby said feed screw may be rotated to move said jaws toward and from each other within the cylindrical bore of the body portion of the chuck, the central portion of said feed screw being unthreaded and a yoke-shaped key mounted within the cylindrical bore of the chuck body and the yoke of which partly encircles the unthreaded portion of the feed screw to prevent movement of the screw in its path of revolution.

2. A chuck device comprising a body portion having a cylindrical bore extending transversely through the axis thereof, two cylindrical jaws mounted to fit snugly in the opposite end portions of said bore and free to move radially of said body, said jaws having threaded bores, the axis of which is eccentric to the axis of said jaws, a feed screw having left and right hand threaded end portions in threaded engagement with the bores of said jaws and arranged entirely within the peripheral boundaries of said jaws, means whereby said feed screw may be rotated to move said jaws toward and from each other within the cylindrical bore of the body portion of the chuck, and means keyed to the chuck body and arranged in said bore and cooperating with said feed screw to prevent movement of the screw in its path of revolution.

3. A chuck device comprising a body portion having a cylindrical bore extending transversely through the axis thereof, two cylindrical jaws mounted to fit snugly in the opposite end portions of said bore and free to move radially of said body, said jaws having threaded bores, the axis of which is eccentric to the axis of said jaws, a feed screw having left and right hand threaded end portions in threaded engagement with the bores of said jaws and arranged entirely within the peripheral boundaries of said jaws, means whereby said feed screw may be rotated to move said jaws toward and from each other within the cylindrical bore of the body portion of the chuck, and means keyed to the chuck body and arranged in said bore and cooperating with said feed screw to prevent movement of the screw in its path of revolution, and said chuck body having a transverse passage extending therethrough at right angles and in intersecting relation to said bore, said passage opening outwardly through opposite sides of said chuck body whereby the relative position of the adjacent faces of the jaws in the chuck body may be seen through either side of said body.

In testimony that I claim the foregoing as my invention I have signed my name this 6th day of October, 1927.

GEORGE W. EMRICK.